United States Patent [19]

Jenkner

[11] 3,883,619
[45] May 13, 1975

[54] PHOSPHORUS AND ALCOHOLIC HYDROXY CONTAINING POLYETHERS AND THEIR PRODUCTION

[75] Inventor: Herbert Jenkner, Cologne, Germany

[73] Assignee: Chemische Fabrik Kalk GmbH, Cologne, Germany

[22] Filed: Apr. 8, 1974

[21] Appl. No.: 459,269

[30] Foreign Application Priority Data
Apr. 12, 1973 Germany............................ 2318328

[52] U.S. Cl..... 260/952; 260/2.5 AR; 260/502.4 R; 260/953; 260/971; 260/978
[51] Int. Cl. ............................................... C07f 9/32
[58] Field of Search ............ 260/971, 952, 978, 953

[56] References Cited
UNITED STATES PATENTS

| | | | |
|---|---|---|---|
| 3,468,983 | 9/1969 | Praetzel et al.................. | 260/978 X |
| 3,597,509 | 8/1971 | Praetzel et al.................. | 260/978 X |
| R27,887 | 1/1974 | McGary et al..................... | 260/952 |

Primary Examiner—Lorraine A. Weinberger
Assistant Examiner—Richard L. Raymond
Attorney, Agent, or Firm—Burns, Doane, Swecker & Mathis

[57] ABSTRACT

An improvement in a process for forming polyether compounds suitable for the ultimate production of soft or semi-hard polyurethane resin foam products.

An alcoholic hydroxy group and phosphorus-containing polyether is formed by reacting white phosphorus with an alkali metal hydroxide, water and a lower alkanal in the presence of a lower alkanol to produce a reaction mixture containing a reaction product primarily comprising an alkali metal salt of a bis-(hydroxyalkane)-phosphinic acid. Sufficient mineral acid is added to the reaction mixture to convert the alkali metal salt of the phosphinic acid to the free acid and volatile components are distilled to leave a product consisting essentially of the free bis-(hydroxyalkane)-phosphinic acid which is then reacted with at least one epoxy compound to produce the said alcoholic hydroxy group and phosphorus-containing polyether. The alcoholic hydroxy group and phosphorus-containing polyether compound is then reacted with an anhydride of a monocarboxylic acid having from two to four carbon atoms.

4 Claims, No Drawings

PHOSPHORUS AND ALCOHOLIC HYDROXY CONTAINING POLYETHERS AND THEIR PRODUCTION

BACKGROUND OF THE INVENTION

U.S. Pat. No. 3,468,983 discloses and claims a bis-(hydroxyalkane)-phosphinic the production of alcoholic hydroxyl group and phosphorus-containing polyethers. In that process, white phosphorus is reacted with approximately stoichiometric quantities of alkali hydroxide, aldehydes and water in the presence of alcohols at 30° to 75°C., preferably 40° to 65°C. The reaction production consists mainly of the alkali salt of the bis-(hydroxyalkane)-phosphinic acid. After distilling off volatile components, the alkali salt of the bis-(hydroxyalkane)-phosphinic acid is reacted with an epoxy compound (e.g., epichlorohydrin, ethylene oxide) at a temperature of from about 50° to 160°C. At least about 3 moles of epoxy compound is used per gram atom of phosphorus contained in the reactant product. The resulting alcoholic hydroxyl group and phosphorus-containing polyethers generally have a phosphorus content of from about 3 to 12 percent by weight, hydroxyl numbers of about 60 to 400 and acid numbers of from about 2 to 6. These polyethers are suitable for the production of self-extinguishing polyurethanes which have a high resistance to hydrolysis.

U.S. Pat. No. 3,597,509, a continuation-in-part of the aforesaid U.S. Pat. No. 3,468,983, describes a further development of the process for the production of alcoholic hydroxyl groups and phosphorus-containing polyethers. In that process, a strong, anhydrous mineral acid is added to the alkali salt of the bis-(hydroxyalkane)-phosphinic acid formed as the reaction product from the reaction of the white phosphorus, alkali hydroxide, water and aldehydes in an amount of about 1 equivalent of the acid per gram atom of phosphorus contained therein. The reaction product of this latter reaction consists mainly of the free bis-(hydroxyalkane)-phosphinic acid. After separation of the precipitated alkali salt of the mineral acid and the volatile components, the free bis-(hydroxyalkane)-phosphinic acid compound is reacted with the epoxy compound at a temperature of from about 30° to about 160°C. in an amount of at least about 2 moles of epoxy compound per gram atom of the phosphorus contained in the reaction product.

The polyethers developed according to the process of the aforesaid U.S. Pat. No. 3,597,509 have about the same hydroxyl and acid numbers as the polyethers developed under the process of the parent U.S. Pat. No. 3,468,983. However, the method of formation has been simplified since the free bis-(hydroxyalkane)-phosphinic acid has a considerably lower viscosity than its alkali salt. Also, the process of U.S. Pat. No. 3,597,509 simplifies production of halogen-free polyethers since the free acids may be reacted directly with the halogen-free epoxy compound. In the process of the parent patent, the hydroxyalkane groups must first be etherified with halogen-free epoxy compounds and then esterified with epichlorohydrin for separation of the alkali.

The alcoholic hydroxyl group and phosphorus-containing polyethers with a large number of free hydroxyl groups are also well-suited for the production of self-extinguishing, rigid polyurethane foams. It has been found, however, that difficulties in ultimate physical properties result when such compounds are added to mixtures which are to be processed into semi-rigid polyurethane foams. Polyurethane soft foams are changed even more in their physical properties by the addition of the polyethers formed by either of the above-noted processes. The reason for this change of physical properties of the polyurethane foams apparently lies in the large number of free hydroxyl groups of the alcoholic hydroxyl group and phosphorus-containing polyethers which free hydroxyl groups form cross-linkages in polyurethane mixtures, going in all directions, as a result of which the elastic properties of the semi-hard and soft foams are impaired.

The search is therefore continued for a process for the production of phosphorus-containing fire-retardant components, which can also be used for semi-hard and soft polyurethane foams.

SUMMARY OF THE INVENTION

The present invention provides an improvement in a process for the production of alcoholic hydroxy group and phosphorus-containing polyethers suitable for the formation of soft and semi-hard polyurethane foam in which white phosphorus is reacted with an alkali metal hydroxide, water and a lower alkanal in the presence of a lower alkanol to produce a reaction mixture containing a reaction product primarily comprising an alkali metal salt of a bis-(hydroxyalkane)-phosphinic acid, adding sufficient mineral acid to the reaction mixture to convert the said alkali metal salt of the phosphinic acid to the free acid, distilling off the volatile components to leave a product consisting essentially of the free bis-(hydroxyalkane)-phosphinic acid and reacting said free phosphinic acid with at least one epoxy compound to produce said alcoholic hydroxy group and phosphorous-containing polyether, the improvement which comprises reacting said alcoholic hydroxy group and phosphorus-containing polyether compound with an anhydride of a monocarboxylic acid having from two to four carbon atoms. This process is distinguished and characterized by the fact that the phosphorus and alcoholic hydroxyl group-containing polyethers are subsequently esterified with the acid anhydrides.

DETAILED DESCRIPTION OF THE INVENTION

For carrying out the process of the present invention, the alcoholic hydroxyl group and phosphorus-containing reaction product produced according to the process of U.S. Pat. No. 3,597,509 is placed in a suitable reaction vessel and mixed with the acid anhydrides provided for esterification.

The aforesaid disclosure of U.S. Pat. No. 3,597,509 is herein incorporated by reference. As disclosed therein, the white phosphorus is first introduced into a liquid saturated alcohol, such as, for example, methanol, ethanol, propanol, isopropanol, butanol, isobutanol or a mixture of such alcohols. Then 2.0 to 4.0 mol of an aldehyde per gram atom of phosphorus is added to such phosphorus and alcohol mixture while passing nitrogen therethrough and the resulting mixture heated to 30° to 75°C., preferably 45° to 65°C. At this temperature, a solution of 0.75 to 0.85 mol of alkali metal hydroxide, preferably sodium or potassium hydroxide, and water in a liquid saturated aliphatic alcohol per gram atom of phosphorus is added to such mixture. The total quantitiy of alcohol supplied to the reaction mixture should amount to about 20 mol per gram atom of phosphorus. The temperature of the reaction mixture during the reaction which proceeds with evolution of phosphine is maintained at 30° to 75°C., preferably 45° to 65°C. Unexpectedly, the quantity of phosphine produced is only 10 to 35 percent of the quantity which is normally produced in the production of phosphinic acid from white phosphorus. After completion of the reaction the solvent is distilled off from the reaction mixture, if desired, under reduced pressure. The residue which remains is a highly viscous mass which solididies upon cooling down and mainly consists of the alkali metal salt of the bis-(hydroxyalkane)-phosphinic acid corresponding to the alkali metal hydroxide and the aldehyde employed. The crude product is employed directly for the production of the alcoholic hydroxy group and phosphorus-containing polyethers.

For this purpose, for example, the crude product can be reacted with 3 to 10 mol of epichlorohydrin per gram atom of phosphorus contained therein. In this reaction, on one hand, the hydroxy alkane groups of the alkali metal salts of the bis-(hydroxyalkane)-phosphinic acid are etherified with the secondary alcohol groups formed by opening of the epoxy (oxirane) ring and, on the other hand, the phosphinic acid group is esterified with formation of an alkali metal chloride, to produce the alcoholic hydroxy group and phosphorus-containing polyethers.

The etherification of the reaction products which primarily consist of the alkali metal salts of bis-(hydroxyalkane)-phosphinic acid can, however, also be carried out with epoxy compounds other than epichlorohydrin, such as, for example, ethylene oxide, propylene oxide, styrene oxide, epibromohydrin, glycidol. Such epoxy compounds (2 to 5 mol of) are employed per gram atom of phosphorus in the reaction product, preferably under superatmospheric pressure up to 100 atmospheres and the reaction mixture is heated to temperatures up to 160°C. In such etherification a partial esterification of the phosphinic acid groups also takes place simultaneously. Nevertheless, the acid numbers of the polyetners thus obtained is normally still too high. As a consequence they are then normally given an after-treatment with epichlorohydrin to effect the necessary esterification, for example, by boiling the alkali metal salts of the phosphinic acid polyethers with epichlorohydrin under reflux until the acid number has been reduced to 6 to 3 and less, followed by distilling off the excess epichlorohydrin. It can be of advantage for the progress of the reaction to introduce a small quantity of alkali metal chloride into the reaction mixture together with the epichlorohydrin. Quantities of 0.5 to 5.0 parts by weight of alkali metal chloride per 100 parts by weight of epichlorohydrin can already suffice. The quantity suited for the special case at hand can be easily ascertained by simple preliminary tests.

Aliphatic aldehydes, such as, the lower alkanals, formaldehyde, acetaldehyde, propionaldehyde, butyraldehyde and their low molecular weight polymers of condensation products, such as, paraformaldehyde, trioxane and aldol are suitable for carrying out the process according to the invention. Formaldehyde is employed either as a solution in methanol or it is introduced into the reaction mixture in gaseous form either during the reaction or during the addition of the alkali metal hydroxide.

The alcoholic hydroxy group and phosphorus-containing polyethers obtained according to the invention are colorless to light yellow viscous liquids. Their phosphorus content is about 3 to 13.5 weight percent, the hydroxy numbers thereof are from 60 to 400 and their acid numbers are from 6 to 2. Such polyethers are suited for the production of self-extinguishing polyurethanes. The alcoholic hydroxy groups contained in the polyether can react with isocyanate groups with the formation of polymeric molecules in which the phosphorus is bound to the polymer chains so as to provide lasting flameproofing action. As the phosphorus atoms in the polyethers produced according to the invention are bound to the alcoholic hydroxy groups over P-C bonds, hydrolytic cleavage of the phosphorus from the macromolecules is also practically out of the question.

The reaction product obtained by the reaction of white phosphorus with alkali metal hydroxide, water and aldehydes in the presence of alcohols must be freed from the alcohol used as solvent prior to reaction with the epoxy compound. However, when the main quantity of the alcohol has been removed from the reaction product the viscosity of the reaction product rises to such a degree that the last residues of the alcohol can only be separated off under great difficulties and with increased expenditure of energy.

In the further development of the process it was found the these difficulties could be overcome if water free strong mineral acid is first added to the reaction product in the first step (a) in a quantity about equivalent to each gram atom of the phosphorus contained in such reaction product and then reacting the thus obtained reaction product, mainly consisting of the free bis-(hydroxyalkane)-phosphinic acid, after removal of the precipitated alkali metal salt of the mineral acid and the volatile components, with the epoxy compound at temperatures between 30° and 160°C., whereby at least 2 mols of epoxy compound are employed per gram atom of the phosphorus contained in the reaction product.

The conversion of the alkali metal salts of the bis-(hydroxyalkane) -phosphinic acid obtained in the first step (a) is effected as follows:

After the development of the phosphine ends, the reaction mixture which mainly consists of the alkali metal salt of bis-(hydroxyalkane)-phosphinic acid, is cooled to 0° to 20°C. and a strong mineral acid added thereto. Gaseous mineral acids, such as, hydrogen chloride and hydrogen bromide, are particularly suited for this purpose. However, liquid acids, such as, for example, perchloric acid, can also be used. The addition of mineral acid to the reaction mixture mainly consisting of the alkali metal salt of bis-(hydroxyalkane)-phosphinic acid is continued slowly while stirring until no further alkali metal salt of the mineral acid precipitates out. About 1 equivalent of acid is required for every gram atom of phosphorus in the reaction mixture. The precipitated alkali metal salt ot the mineral acid is then separated from the reaction mixture and the alcohol serving as solvent also removed, preferably, by distillation under vacuum. The reaction product remaining mainly consists of the free bis-(hydroxyalkane)-phosphinic acid. This reaction product is then directly employed for the production of the alcoholic hydroxyl group and phosphorus-containing polyethers.

For this purpose at least 2 mol, preferably, 3 to 10 mol of epoxy compound per gram atom of phosphorus contained in the reaction product are heated under reflux cooling with such product at temperatures of 30° to 160°C. Halogen free epoxy compounds, such as, for example, ethylene oxide, propylene oxide, styrene oxide, glycidol and others are especially suited for this reaction. The reaction mixture is boiled under reflux until its neutralization number (acid number) drops to 5 or below. Thereafter the volatile components are removed, preferably, by distillation under reduced pressure, whereupon the desired free alcoholic hydroxyl group and phosphorus-containing polyether remains as the residue.

The anhydrides of monocarboxylic unsaturated acids having from about two to about four carbon atoms in the molecules are useful as the acid anhydride in the present invention. The acetic anhydride and propionic anhydride are preferred. The amount of acid anhydride present in the reaction mixture depends mainly on the degree of esterification which is desired. Generally, sufficient acid anhydride is used (per gram atom of phosphorus in the said reaction product) to result in a reaction product having a hydroxyl number of from about 10 to 300.

The alcoholic hydroxyl group and phosphorus-containing polyether is mixed with the acid anhydride and the reaction mixture is heated to a reaction temperature of from about 20° to about 120°C. with agitation. Reaction is completed in a short time and can be executed almost quantitatively with regard to yield. Advantageously, the acid anhydride is used in excess and the excess of acid anhydride and the carboxylic acid formed in the reaction are subsequently distilled off from the reaction mixture under decreased pressure. At the same time, a viscous, yellowish mass is obtained as a final product in the distillation residue. The final product has a hydroxyl number between 10 and 300, preferably between about 40 and 120, depending upon the starting materials and reaction conditions. It has been found that final products with a hydroxyl number of between 140 and 300 are suited mainly for flame-resistant adjustment of semi-hard polyurethane foams while for soft foams, flame-retardant compounds with a hydroxyl number between about 30 and 90 are required. Thus, it is possible, according to the process of the present invention to provide a fire-retardant component with optimum characteristics for the polyurethane foam that is to be made flame-retardant by way of selection and composition of the reaction mixture by adjustment of the molar ratio between polyether and acid anhydride.

The invention is additionally illustrated in connection with the following Examples which are to be considered as illustrative of the present invention. It should be understood, however, that the invention is not limited to the specific details of the Examples.

EXAMPLE I

A polyether which is produced according to the process of U.S. Pat. No. 3,597,509 from white phosphorus with sodium hydroxide, water, paraformaldehyde and methanol, reaction of the intermediate product with gaseous hydrochloride and subsequent reaction of the free bis-(hydroxymethane)-phosphinic acid with propylene oxide, has a hydroxyl number of 519. 230 parts by weight of this polyether together with 111.2 parts by weight acetic anhydride are placed into a reaction vessel and both are mixed together. The reaction vessel is placed into a water bath with careful exclusion of moisture and the contents of the vessel are heated while stirring well for 2 hours with the help of a boiling water bath. Thereafter, the reaction mixture is transferred without cooling to a vacuum distillation apparatus. The formed acetic acid begins to distill off during a slow reduction in pressure, whereby a distillation temperature between 60° and 100°C. appears at a pressure between 1 and 12 Torr. Later, the excess of acetic anhydride can also be distilled off by a slight raise in the temperature.

161 parts by weight of a viscous, yellowish substance with a phosphorus content of 11.95 percent by weight and a hydroxyl number of 79 is abtained. The product is suited as a fire-retardant component for polyurethane soft foams.

EXAMPLE II 230 parts by weight of the same starting polyether made in Example I together with 75.6 parts by weight of acetic anhydride are placed into a reaction vessel, mixed and heated while stirring as in Example I for 2 hours in the boiling water bath. After distilling off the acetic acid formed and the excess acetic anhydride, 149 parts by weight of a final product with a phosphorus content of 12.9 percent by weight and a hydroxyl number of 164 are obtained. The product is suited as a fire-retardant component for polyurethane semi-hard foams.

The principles, preferred embodiments and modes of operation of the present invention have been described in the foregoing specification. The invention which is intended to be protected herein, however, is not to be construed as limited to the particular forms disclosed, since these are to be regarded as illustrative rather than restrictive. Variations and changes may be made by those skilled in the art without departing from the spirit of the invention.

What is claimed is:

1. A process for the production of alcoholic hydroxy group and phosphorus-containing polyethers suitable for the formation of soft and semi-hard polyurethane foam in which white phosphorus is reacted with an alkali metal hydroxide, water and a lower alkanal in the presence of a lower alkanol at a temperature between about 30° and 75°C., the quantities of alkali metal hydroxide, water and alkanal respectively supplied to the reaction being about 0.75 to 0.85, 0.75 to 0.85 and 2 to 4 mol per g.-atom of white phosphorus, to produce a reaction mixture containing a reaction product primarily comprising an alkali metal salt of a bis-(hydroxyalkane)-phosphinic acid, adding sufficient mineral acid to the reaction mixture to convert the said alkali metal salt of the phosphinic acid to the free acid, distilling off the volatile components to leave a product consisting essentially of the free bis-(hydroxyalkane)-phosphinic acid and reacting said free phosphinic acid with at least one epoxy compound at a temperature between about 30° and 160°C., the quantity of epoxy compound being such as to provide at least 2 mole per g.-atom of phosphorus contained in said free phosphinic acid, to produce said alcoholic hydroxy group and phosphorus-containing polyether, the improvement which comprises reacting said alcoholic hydroxy group and phosphorus-containing polyether compound with an anhydride of a monocarboxylic acid having form two to four carbo atoms at a temperature of from about 20° to 120°C., with agitation to produce a reaction product primarily comprising the 2 to 4 carbon acid ester of the said polyether.

2. The improvement of claim 1 wherein said reaction with the acid anhydride is performed sufficiently to produce a reaction product having a hydroxyl number between 10 and 200.

3. The improvement of claim 1 wherein said anhydride is acetic anhydride.

4. The product of the process of claim 1.

* * * * *